No. 728,510. Patented May 19, 1903.

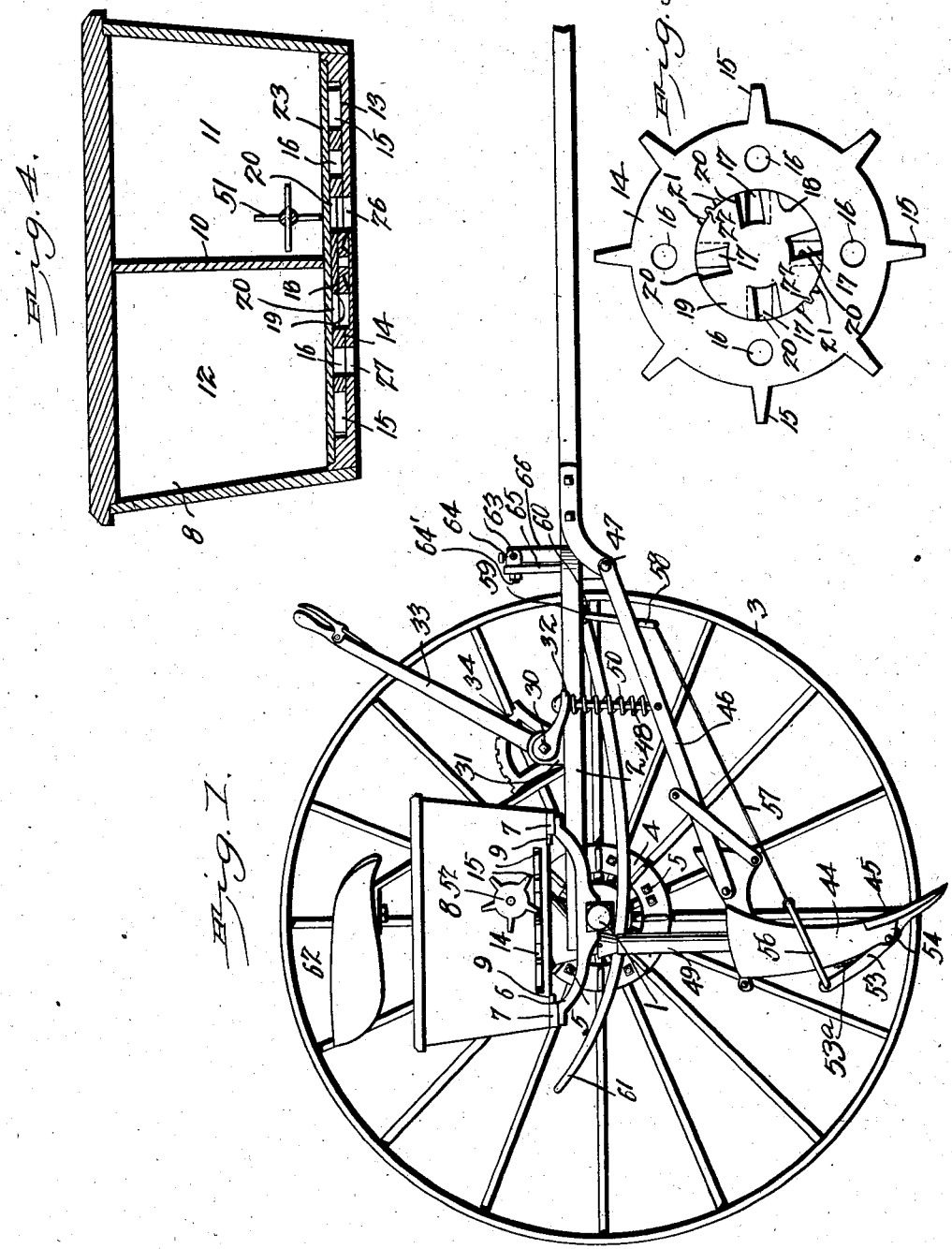

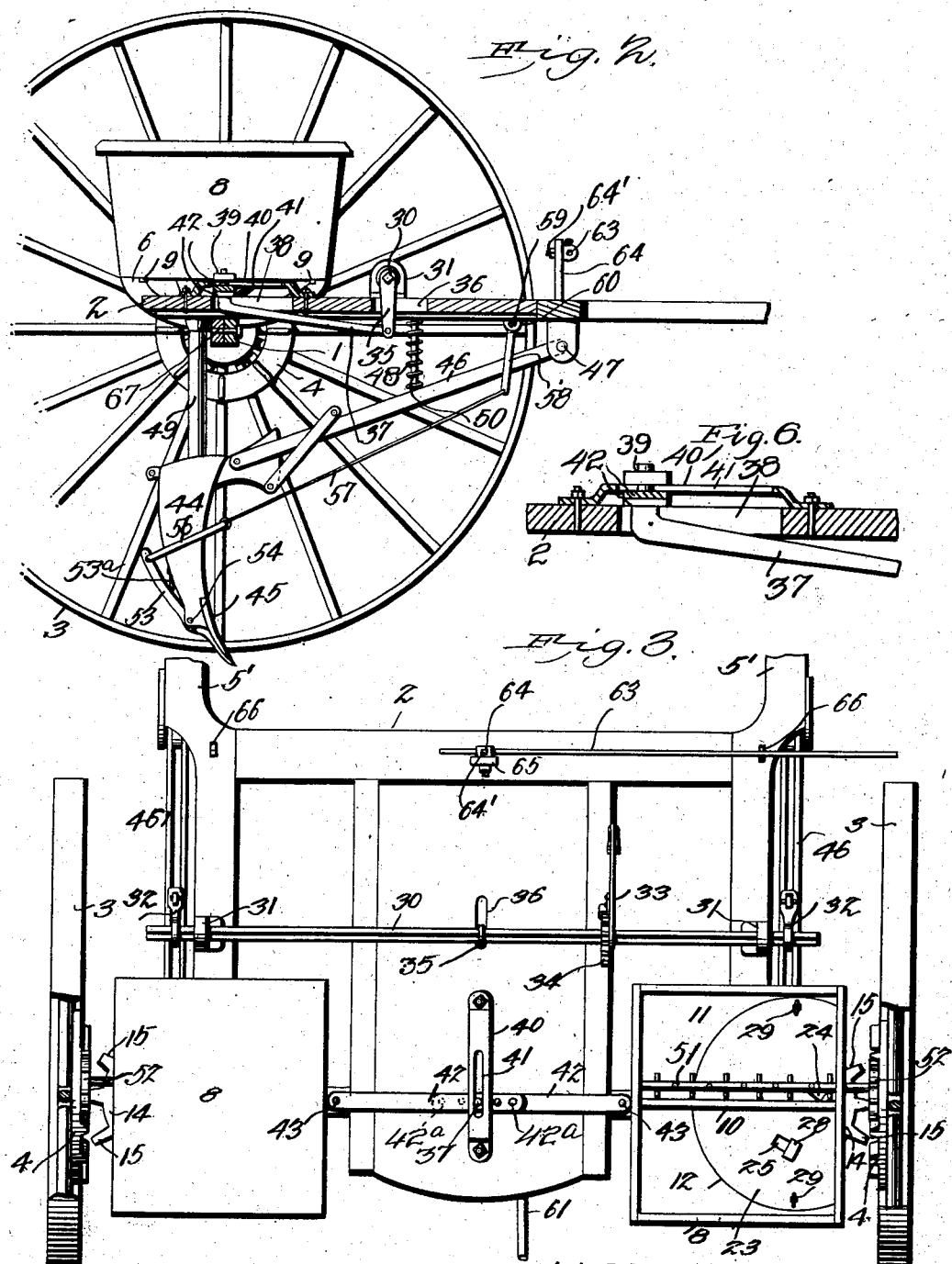

UNITED STATES PATENT OFFICE.

HENRY DAVID SMITH, OF NEWBERN, VIRGINIA.

CORN-PLANTER.

SPECIFICATION forming part of Letters Patent No. 728,510, dated May 19, 1903.

Application filed April 29, 1902. Serial No. 105,171. (No model.)

*To all whom it may concern:*

Be it known that I, HENRY DAVID SMITH, a citizen of the United States, residing at Newbern, in the county of Pulaski and State of Virginia, have invented a new and useful Corn-Planter, of which the following is a specification.

My invention is an improved combined planter and fertilizer-distributer for planting crops, such as corn, either in drills or in check-rows; and it consists in the peculiar construction and combination of devices hereinafter fully set forth and claimed.

In the accompanying drawings, Figure 1 is a side elevation of a combined planter and fertilizer-distributer constructed in accordance with my invention. Fig. 2 is a longitudinal sectional view of the same. Fig. 3 is a top plan view of the same. Fig. 4 is a vertical transverse sectional view of one of the hoppers. Fig. 5 is a detail top plan view of one of the disks for dropping the seeds and fertilizer.

The axle 1 is here shown as secured to the under side of a frame 2, near the rear end thereof, and on the spindles of the axle are the supporting-wheels 3. On the inside of each of the said wheels is a crown-gear 4, the same comprising a circular plate having the crown-teeth on the inner side thereof and being secured to the spokes of the wheel by means of clip-bolts 5. The frame 2 is provided with thills 5', the rear portions of which form the outer sides of the frame. On the opposite end portions of the axle are two pairs of longitudinally-disposed bolster-bars 6, the ends of which are curved upwardly, as shown in Fig. 1, and the said pairs of bolster-bars are respectively connected at their front ends by cross-bars 7. Laterally-movable hoppers 8 bear on the said cross-bars 7 and are adapted to slide thereon, and the said hoppers have guides 9 on their lower sides which bear against the inner sides of the bars 7 and serve to retain the hoppers on the said bars and to guide them thereon. Any other suitable means may be employed for connecting the hoppers to the supporting-bars 7, so that the hoppers are adapted to be moved laterally on the said bars, and I do not limit myself in this particular.

Each of the hoppers is divided by a transversely-disposed partition 10 into a front fertilizer-compartment 11 and a rear corn-compartment 12. In the bottom of the hopper, in the upper side thereof, is a seat 13, which is nearly a complete circle and in which is disposed a revoluble seed and fertilizer dropping disk 14, the same projecting from the outer side of the hopper and having peripheral spurs 15 of suitable depth. The said disk 14 is provided with seed cups or openings 16, disposed equidistant from the center thereof, and a concentrically-disposed series of fertilizer-dropping openings 17, the latter being within the radius of the seed cups or openings 16, but in radial alinement therewith. In the upper side of each disk 14, at the center thereof, is a circular seat 18, in which is disposed a cut-off or regulating plate 19, the latter having openings 20 adapted to register with the openings 17 of the said disk and corresponding in size and shape therewith, and it will be understood that by partly turning the said cut-off or regulating plates to dispose their openings angularly with reference to the openings 17 the latter may be either partly cut off to any desired extent or entirely cut off at will. Hence the quantity of fertilizer dropped by each opening 17 may be regulated. The disks 14 are provided with adjusting-notches 21, the inner ends of which communicate with the seats 18, and the plates 19 are provided with spurs 22 to engage said notches to lock the said plates in their said seats at any desired adjustment, it being understood that the plates 19 must be first raised slightly to clear their spurs 22 from the notches 21, with which they have been engaged, before the said plates can be turned to cause their said spurs to engage other of said notches 21. When adjusted in the seats 18, the plates 19 have their upper sides level with those of the disks 14. Each hopper has a removable false bottom plate 23 to cover the disk 14 and plate 19 in the bottom of the hopper, and the said plates 23 are each provided with an opening 24, with which the fertilizer-openings in the plates 14 and 19 successively register, and with a seed-opening 25, with which the openings 16 of the revoluble plate 14 successively register, and hence when the machine is in motion and the plates or disks 14 are being rotated the same will drop fertilizer and seeds through the openings 26 and 27, respectively, in the bottoms of the hoppers, as will be understood. Over each opening 25, and at one side thereof, is disposed a cut-off brush 28. The partitions 10, as well as the false bottom plates 23, are removable from the hoppers, and the bottom plates 23 are secured to the bottoms of the hoppers by any suitable means, thumb-screws 29 being shown for this purpose.

It will be understood that when the hoppers are moved outwardly to engage the spurs of the revoluble seed and fertilizer dropping disks or plates with the crown-gears 4 said disks or plates will be rotated by the operation of the wheels 3 when the machine is in motion, and that when the hoppers are moved inwardly the seed and fertilizer dropping disks are out of gear with the gears 4.

I will now describe means for simultaneously moving the hoppers so that the seed and fertilizer dropping disks may be thrown into or out of gear by a single operation. A rock-shaft 30 is disposed transversely over the frame 2 and journaled in bearings 31. Said rock-shaft has rock-arms 32 at its ends employed for raising and lowering the furrowing shovels and drills, as hereinafter stated, and said rock-shaft has also a hand-lever 33, by which it may be partly turned. The hand-lever is provided with the usual spring-pressed or gravity locking-dog, which coacts with a segment-rack 34 to lock said hand-lever, and hence the rock-shaft, at any desired adjustment. The said rock-shaft is further provided with a downwardly-extending rock-arm 35, which passes through and is adapted to operate in an opening 36 in the platform of the frame 2, and to the lower end of the said rock-arm 35 is pivotally connected the front end of a shifting rod 37. The rear end of the said rod 37 is upturned and adapted to slide longitudinally in a slot 38 in the platform of the frame. At the upper end of the upturned portion of said slide-rod is a head 39, here shown as a nut, which bears on the upper side of a longitudinally-disposed slotted guide-plate 40, which is secured on the upper side of the platform of the frame. The upper end of the upturned portion of said slide-rod operates in the slot 41, and to said upturned portion of the slide-rod are pivoted the inner ends of shifting links 42, which have their outer ends pivotally connected to the inner sides of the hoppers 8, as at 43. It will be understood from the foregoing that when the rock-shaft 30 is turned by the hand-lever 33 to move the shifting rod 37 longitudinally said rod, through the links 42, shifts the hoppers to put the fertilizer and seed dropping disks or plates thereof in or out of gear with the gears 4. Hence at a single motion of the lever 33 the machine may be adapted for operation or thrown out operation.

The drill-shoes 44, which carry the furrow-opening points or shovels 45, are connected to the rear ends of draft-bars 46, which latter have their front ends pivotally connected to the sides of the frame at or near the front end thereof, as at 47. Lifting-rods 48 connect said draft-bars to the rock-arms 32 of the shaft 30, and hence it will be understood that when the lever 33 is moved to put the dropping mechanisms in gear by shifting the hoppers the drill-shoes will be simultaneously lowered, and said drill-shoes will be elevated when the machine is thrown out of gear. The usual flexible tubes 49 are employed to convey the seed and fertilizer from the hoppers through the drill-shoes to the ground in the furrows made by the points or shovels 45. Springs 50 are shown on the rods 48 and which bear between the draft-bars 46 and the rock-arms 32, said springs serving to keep the drill-shoes depressed, but permitting them to rise to pass over roots or stones, and thus avoid breaking the drill-shoes or the points or shovels carried thereby.

It will be understood from the foregoing that my improved planter and fertilizer-distributer is adapted for planting corn or other seeds in drills. It is desirable to provide means to prevent the fertilizer, which is sometimes moist, from becoming clogged in the fertilizer-compartments of the hoppers, and to this end I employ revoluble stirrers 51, at the outer ends of the shafts of which are spurred wheels 52, the spurs of which are engaged by the crown-gears 4 on the wheels 3, whereby said stirrers are rotated when the machine is in operation.

I have also invented means by which my planter and fertilizer-distributer is adapted for use in planting in check-rows, which means I will now describe.

In the rear and lower portions of the drill-shoes, which are open, are disposed accumulating-valves 53, which are pivoted, as at 54, and the lower ends of which project downwardly below the lower ends of the said drill-shoes and extend approximately to the points of the shovels thereof, so that they are disposed in the furrows below the surface of the soil when the machine is in operation. Each of the said accumulating-valves is normally maintained in a position to close the lower end of the drill-shoe, which carries it by a spring $53^a$, such as indicated at Fig. 2. The said spring is here shown as secured to the rear side of the drill-shoe and with its free end bearing against the upper arms of the accumulating-valve. Loops or links 56 are connected to the said upper arms of the accumulating-valves, pass around, and extend forwardly of the drill-shoes and are connected, by means of rods or cords 57, to the lower ends of rock-arms 58, with which a rock-shaft 59 is provided. The said rock-shaft is here shown as disposed under the frame 2 and journaled in bearings 60, and to the said rock-shaft is attached a hand-lever 61. In Fig. 1 of the drawings said hand-lever is shown as extending under the platform or frame and projecting in rear thereof, so that it is adapted to be operated manually by the driver when he is walking in rear of the machine, which it is preferred that he shall do when the machine is used for planting in check-rows. The seeds and fertilizer dropped in the drill-shoes by the operation of the machine as it passes from cross-row to cross-row accumulate in the bottoms of the drill-shoes at the points of the shovels, and as the latter come abreast of each cross row or furrow the operator depresses the lever 61 manually, thereby causing the accumulating-valves to open by the operation of the rock-shaft and the connections hereinbefore described, so that the seeds and fertilizer are dropped by the action of the accumulating-valves directly in the cross-furrows at the bottom of the furrows opened by the drill-shoe shovels.

It will be understood that the hand-lever 61 may be so disposed, if preferred, that it may be operated by the driver when he is riding and is sitting on the seat 62; but where the ground is uneven the best practical purposes are attained when the hand-lever is operated manually from behind the machine.

A marker-bar 63 is slidably secured in a block or head 64, which is pivotally mounted in a standard 65, that is disposed on the center of the frame 2, at the front end thereof. The said marker-bar is adapted to be extended from either side of the frame as far as may be required to mark a parallel adjacent row and is adapted to be turned on the pivot 64 to either side of the machine, and when disposed in operative position its outer portion rests on one of the supports 66 with which the frame 2 is provided at or near its front corners.

My improved planter and fertilizer-distributer is exceedingly simple in construction, may be manufactured at small cost, and is adapted to be readily drawn by one horse to plant two rows simultaneously either in drills or in check-rows and either with or without fertilizer.

The axle 1 is composed of two sections having their inner ends overlapped and slidably connected together by bolts 67, whereby the wheels 3 may be adjusted laterally to narrow or widen the space between them, according to the desired width of the spaces between the rows.

The draft-bars 46 are laterally shiftable on the pivots 47, so that the drill-shoes may be correspondingly adjusted, and the inner overlapped portions of the links 42 have a plurality of adjusting-openings 42$^a$ adapted to engage the upturned rear end of the rod 37, and hence a corresponding adjustment of the hoppers may also be effected to enable the rows to be planted at any desired width apart.

When used for planting in check-rows, my improved planter may be run either directly across the furrows at right angles thereto or obliquely across the furrows in either direction, as may be desired.

A set-screw 64' secures the marker-bar when adjusted to the head or pivot 64.

Having thus described my invention, I claim—

1. In a planter, the combination with relatively fixed gears, of movable hoppers, guides therefor, dropping mechanisms, carried by and movable with the hoppers and including gears adapted to engage the first-mentioned gears, shifting links having their outer ends flexibly connected to the hoppers, a lever, and a connection between the same and the inner ends of the shifting links, substantially as described.

2. In a planter, the combination with relatively fixed gears, of movable hoppers, guides therefor, dropping mechanisms carried by and movable with the hoppers and including gears adapted to engage the first-mentioned gears, shifting links having their outer ends flexibly connected to the hoppers, a lever, and a connection between the same and the inner ends of the shifting links, vertically-movable furrow-openers, and connections between them and said lever, whereby the furrow-openers and hoppers are simultaneously movable thereby, substantially as described.

3. In a planter, the combination of a hopper, a revoluble dropping-plate in the bottom thereof having peripheral spurs, one side of said dropping-plate projecting through an opening in one side of the hopper, and a stirrer in the hopper, having a gear disposed beyond one side thereof and engaging the projecting portion of the first-mentioned gear, substantially as described.

4. In a planter, the combination of a hopper having seed and fertilizer compartments, a false bottom plate having openings to discharge from said compartments and a bottom with openings out of register with the first-mentioned openings, a revoluble dropping-disk disposed between the bottom and false bottom plate of the hopper and having seed and fertilizer openings at different distances from its center and adapted to successively register with the respective seed and fertilizer openings of the hopper-bottom and its false bottom plate, and means carried by the said disk and adjustable thereon to cover the fertilizer-opening therein to any desired extent, substantially as described.

In testimony that I claim the foregoing as my own I have hereto affixed my signature in the presence of two witnesses.

HENRY DAVID SMITH.

Witnesses:
R. G. HUDSON,
B. E. WATSON.